US012686187B2

(12) United States Patent
Zhao et al.

(10) Patent No.: US 12,686,187 B2
(45) Date of Patent: Jul. 21, 2026

(54) RESIN TRANSFER MOLDING IN COMPOSITE MANUFACTURING

(71) Applicant: GM GLOBAL TECHNOLOGY OPERATIONS LLC, Detroit, MI (US)

(72) Inventors: Selina Xinyue Zhao, Rochester Hills, MI (US); Venkateshwar R. Aitharaju, Troy, MI (US); Roger G. Ghanem, Los Angeles, CA (US); Douglas Bradley, Milford, MI (US); Adam Burley, Auburn Hills, MI (US)

(73) Assignees: GM GLOBAL TECHNOLOGY OPERATIONS LLC, Detroit, MI (US); Board of Trustees of Michigan State University, East Lansing, MI (US); CSP Innovations, Inc., Auburn Hills, MI (US)

( * ) Notice: Subject to any disclaimer, the term of this patent is extended or adjusted under 35 U.S.C. 154(b) by 204 days.

(21) Appl. No.: 18/605,235

(22) Filed: Mar. 14, 2024

(65) Prior Publication Data

US 2025/0289193 A1 Sep. 18, 2025

(51) Int. Cl.
| | |
|---|---|
| *B29C 70/48* | (2006.01) |
| *B29C 37/00* | (2006.01) |
| *B29C 70/54* | (2006.01) |
| *G06N 3/044* | (2023.01) |
| *B29K 63/00* | (2006.01) |
| *B29K 75/00* | (2006.01) |
| *G06N 3/04* | (2023.01) |

(52) U.S. Cl.
CPC .............. *B29C 70/48* (2013.01); *B29C 37/00* (2013.01); *B29C 70/546* (2013.01); *G06N 3/044* (2023.01); *B29C 2037/903* (2013.01); *B29K 2063/00* (2013.01); *B29K 2075/00* (2013.01)

(58) Field of Classification Search
CPC ..................................................... B29C 70/00
See application file for complete search history.

(56) References Cited

U.S. PATENT DOCUMENTS

| | | | |
|---|---|---|---|
| 7,758,800 B2 * | 7/2010 | Cicci ..................... | B29C 70/443 |
| | | | 264/511 |
| 10,717,244 B2 * | 7/2020 | Ghanem ............... | B29C 70/548 |
| 2007/0145622 A1 | 6/2007 | Cicci et al. | |
| 2018/0319046 A1 * | 11/2018 | Johnson .............. | B29C 35/0288 |

FOREIGN PATENT DOCUMENTS

| | | | | |
|---|---|---|---|---|
| CN | 112208122 A * | 1/2021 | ........... | B29C 70/443 |
| DE | 102016112262 A1 | 1/2018 | | |
| DE | 102016116024 A1 | 3/2018 | | |
| DE | 102018104519 A1 | 8/2019 | | |
| DE | 102019210171 A1 | 1/2021 | | |
| WO | WO-2022100649 A1 | 5/2022 | | |

OTHER PUBLICATIONS

German Office Action from counterpart DE1020241123907, dated Dec. 5, 2024.
U.S. Appl. No. 18/495,227, filed Oct. 26, 2023, Zhao et al.

* cited by examiner

*Primary Examiner* — Atul P. Khare

(57) ABSTRACT

A resin transfer molding system includes a resin transfer mold configured to mold a composite material via resin injection and curing, a pressure sensor configured to measure an in-mold pressure, a dielectric sensor configured to measure an in-mold degree of cure value, a resistance circuit configured to measure an in-mold flow front position, and a molding process control module configured to determine a molding process anomaly status by comparing a specified anomaly threshold to at least one of pressure data obtained from the at least one pressure sensor, degree of cure data obtained from the at least one dielectric sensor, or flow front position data obtained from the at least one resistance circuit, reduce an injection flow rate in response to a determination of a molding process anomaly, and maintain the injection flow rate in response to a determination of normal molding process operation without the molding process anomaly.

18 Claims, 10 Drawing Sheets

RESIN TRANSFER MOLDING IN COMPOSITE MANUFACTURING

GOVERNMENT LICENSE RIGHTS

This invention was made with government support under DE-EE0009204 awarded by the U.S. Department of Energy. The government has certain rights in the invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to resin transfer molding in composite manufacturing, including modification of a molding process using a trained model, based on mold sensor data.

High-pressure resin transfer molding may be used for composite manufacturing, where a resin is injected into a mold cavity and then cured to create a molded component. However, molded components may experience manufacturing defects, such as dry spot, fiber wash, resin rich regions, etc. This results in material or scrap cost and loss of molding throughput.

SUMMARY

A resin transfer molding system includes a resin transfer mold configured to mold a composite material via resin injection and curing, at least one pressure sensor configured to measure an in-mold pressure of the resin transfer mold, at least one dielectric sensor configured to measure an in-mold degree of cure value, at least one resistance circuit configured to measure an in-mold flow front position, and a molding process control module configured to determine a molding process anomaly status by comparing a specified anomaly threshold to at least one of pressure data obtained from the at least one pressure sensor, degree of cure data obtained from the at least one dielectric sensor, or flow front position data obtained from the at least one resistance circuit, reduce an injection flow rate in response to a determination of a molding process anomaly, and maintain the injection flow rate in response to a determination of normal molding process operation without the molding process anomaly.

In other examples, the molding process control module is configured to, subsequent to reducing the injection flow rate, determine the molding process anomaly status by comparing the specified anomaly threshold to at least one of pressure data, degree of cure data, or flow front position data, and increase the injection flow rate in response to a determination of normal molding process operation without the molding process anomaly.

In other examples, determining the molding process anomaly status includes comparing the specified anomaly threshold to at least two of pressure data obtained from the at least one pressure sensor, degree of cure data obtained from the at least one dielectric sensor, or flow front position data obtained from the at least one resistance circuit.

In other examples, determining the molding process anomaly status includes comparing the specified anomaly threshold to all three of pressure data obtained from the at least one pressure sensor, degree of cure data obtained from the at least one dielectric sensor, or flow front position data obtained from the at least one resistance circuit.

In other examples, determining the molding process anomaly status includes supplying pressure data obtained from the at least one pressure sensor to a trained machine learning model, supplying degree of cure data obtained from the at least one dielectric sensor to the trained machine learning model, and supplying flow front position data obtained from the at least one resistance circuit to the trained machine learning model, and the determination of the molding process anomaly is based on an output of the trained machine learning model.

In other examples, the molding process control module is configured to obtain a training data set including multiple mold quality index values each corresponding to at least one of pressure data obtained from the at least one pressure sensor, degree of cure data obtained from the at least one dielectric sensor, or flow front position data obtained from the at least one resistance circuit, and train a machine learning model, using the training data set, to generate the trained machine learning model.

In other examples, each of the multiple mold quality index values is obtained via at least one of an X-ray image or a thermography image of a composite material subsequent to curing.

In other examples, the at least one pressure sensor includes a pressure sensor flush mounted in a cavity of the resin transfer mold, the at least one dielectric sensor is configured to measure an ionic viscosity of resin in the cavity, and the at least one resistance circuit includes resistance circuitry extending across at least eighty percent of a longitudinal direction of the cavity.

In other examples, the molding process control module is configured to close a press of the resin transfer mold to a mold position, and apply tonnage to the press, inject an epoxy or a polyurethane into the cavity of the resin transfer mold, and execute a curing cycle subsequent to injecting the epoxy or polyurethane into the cavity of the resin transfer mold.

In other examples, the system includes a human-machine interface configured to display a training mode option and an operation mode option for selection by a user, wherein the human-machine interface is configured to receive an input to set the specified anomaly threshold in response to selection of the operation mode option, and the human-machine interface is configured to receive an input to specify one or more sensor sources to train the trained machine learning model in response to selection of the training mode option.

A method for controlling a resin transfer molding process includes executing a resin transfer molding process to mold a composite material via resin injection and curing in a resin transfer mold, measuring, by at least one pressure sensor, an in-mold pressure of the resin transfer mold, measuring, by at least one dielectric sensor, an in-mold degree of cure value, measuring, by at least one resistance circuit, an in-mold flow front position, determining a molding process anomaly status by comparing a specified anomaly threshold to at least one of pressure data obtained from the at least one pressure sensor, degree of cure data obtained from the at least one dielectric sensor, or flow front position data obtained from the at least one resistance circuit, reducing an injection flow rate in response to a determination of a molding process anomaly, and maintaining the injection flow rate in response to a determination of normal molding process operation without the molding process anomaly.

In other examples, the method includes, subsequent to reducing the injection flow rate, determining the molding process anomaly status by comparing the specified anomaly threshold to at least one of pressure data, degree of cure data, or flow front position data, and increasing the injection flow rate in response to a determination of normal molding process operation without the molding process anomaly.

In other examples, determining the molding process anomaly status includes comparing the specified anomaly threshold to at least two of pressure data obtained from the at least one pressure sensor, degree of cure data obtained from the at least one dielectric sensor, or flow front position data obtained from the at least one resistance circuit.

In other examples, determining the molding process anomaly status includes comparing the specified anomaly threshold to all three of pressure data obtained from the at least one pressure sensor, degree of cure data obtained from the at least one dielectric sensor, or flow front position data obtained from the at least one resistance circuit.

In other examples, determining the molding process anomaly status includes supplying pressure data obtained from the at least one pressure sensor to a trained machine learning model, supplying degree of cure data obtained from the at least one dielectric sensor to the trained machine learning model, and supplying flow front position data obtained from the at least one resistance circuit to the trained machine learning model, and the determination of the molding process anomaly is based on an output of the trained machine learning model.

In other examples, the method includes obtaining a training data set including multiple mold quality index values each corresponding to at least one of pressure data obtained from the at least one pressure sensor, degree of cure data obtained from the at least one dielectric sensor, or flow front position data obtained from the at least one resistance circuit, and training a machine learning model, using the training data set, to generate the trained machine learning model.

In other examples, each of the multiple mold quality index values is obtained via at least one of an X-ray image or a thermography image of a composite material subsequent to curing.

In other examples, the at least one pressure sensor includes a pressure sensor flush mounted in a cavity of the resin transfer mold, the at least one dielectric sensor is configured to measure an ionic viscosity of resin in the cavity, and the at least one resistance circuit includes resistance circuitry extending across at least eighty percent of a longitudinal direction of the cavity.

In other examples, the method includes closing a press of the resin transfer mold to a mold position, and apply tonnage to the press, injecting an epoxy or a polyurethane into the cavity of the resin transfer mold, and executing a curing cycle subsequent to injecting the epoxy or polyurethane into the cavity of the resin transfer mold.

In other examples, the method includes displaying, on a human-machine interface, a training mode option and an operation mode option for selection by a user, receiving an input to set the specified anomaly threshold in response to selection of the operation mode option, and receiving an input to specify one or more sensor sources to train the trained machine learning model in response to selection of the training mode option.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

High-pressure resin transfer molding may be used for composite manufacturing, where a resin is injected into a mold cavity and then cured to create a molded component. However, molded components may experience manufacturing defects, such as dry spot, fiber wash, resin rich regions, etc. This results in material or scrap cost and loss of molding throughput.

Some example embodiments described herein provide systems and methods for using a trained predictive model (e.g., an artificial intelligence (AI) model, machine learning model, etc.) to improve or optimize a manufacturing process for molded components, such as a high-pressure resin transfer molding (HP-RTM) process. A human-machine interface (HMI) may be used to allow an operator to train the model using sensor inputs, and then operate molding cycles using the trained model.

For example, a trained model for controlling the molding process may receive inputs from various sensors, such as pressure sensors distributed in the mold and configured to provide pressure data during injection of molding material into a cavity. Dielectric sensors may be distributed in the mold, and configured to provide curing state data during injection of the molding material. Resistance circuits may be located in a preform of the injection mold, and configured to monitor resistance changes during the injection process.

Example embodiments may specify detection of molded component anomaly criteria, which may be tailored for each type of sensor. If an anomaly is detected, based on a prediction output of the trained model, the molding process may be modified such as by reducing a flow rate of the injected molding material. A human-machine interface may be configured to integrate functionality for both training of the model and use of the trained model in production.

Figure 1:
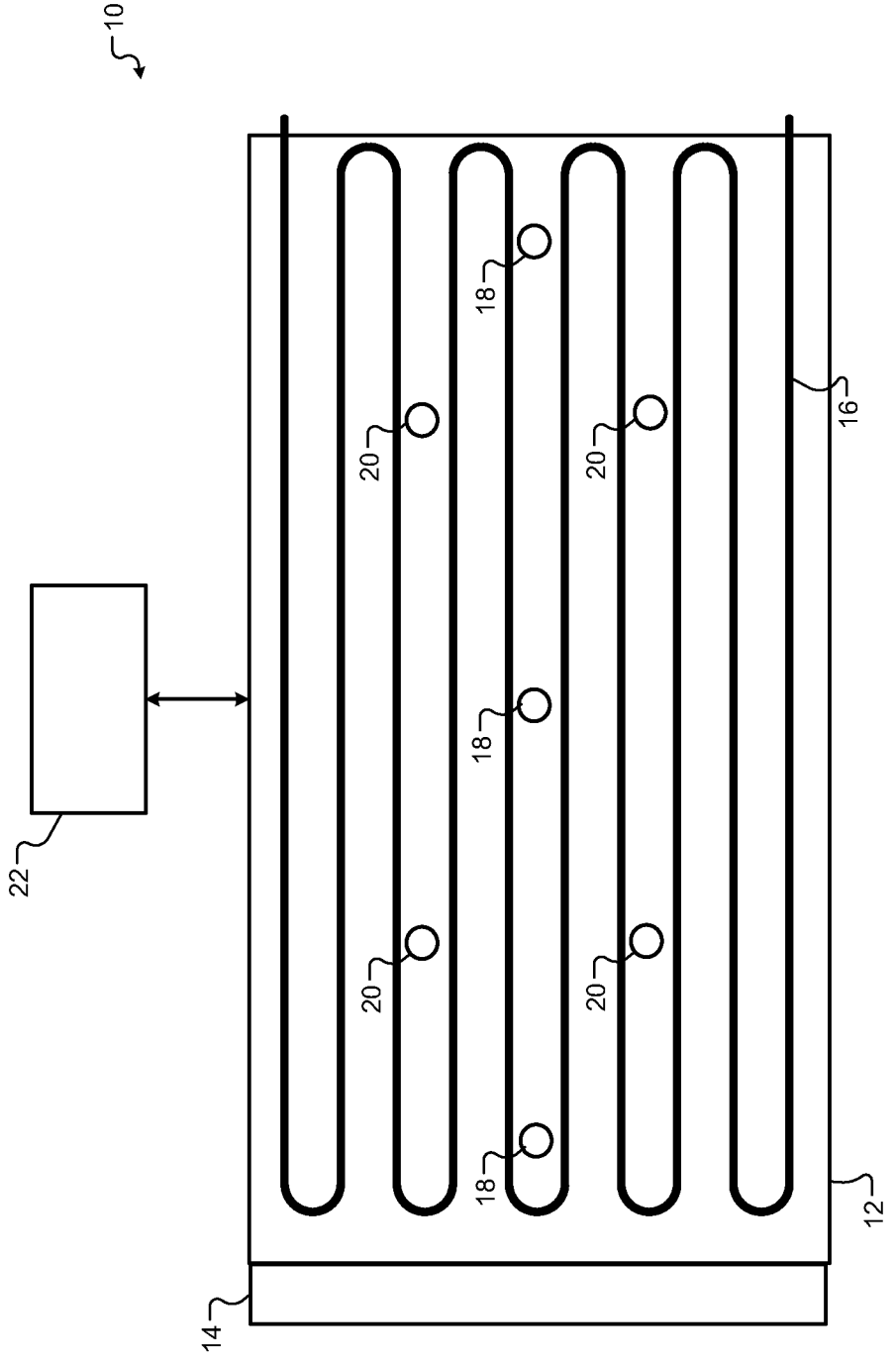
FIG. 1 is a functional block diagram of an example injection mold including pressure sensors, dielectric sensors and resistance circuitry.

FIG. 1 is a functional block diagram of an example injection mold including pressure sensors, dielectric sensors and resistance circuitry. As shown in FIG. 1, the injection mold 10 includes a cavity 12 configured to receive injection molding material (e.g., resin) from a mold injection source 14. The injection mold 10 may include any suitable components for composite manufacturing, such as a press configured to close over the cavity 12, an apparatus configured to apply tonnage to the press, a device configured to generate a vacuum in the cavity 12, one or more components for curing the injected molding material, etc.

A mold process control module 22 is configured to control the molding process. For example, the mold process control module 22 may be configured to control opening and closing of the press, a position of the press, tonnage applied to the press, control of a vacuum condition, injection flow rate of molding material from the mold injection source 14, curing of the molding material, etc.

The mold process control module 22 may be configured to receive sensor data from one or more sensors associated with, or disposed in, the cavity 12. For example, the injection mold 10 may include pressure sensors 18 configured to sense pressure values within the cavity, dielectric sensors 20 configured to sense dielectric values within the cavity (such as viscosity data), a resistance circuit sensor 16 configured to sense a flow front position of the injected molding material, etc. The mold process control module 22 may be configured to receive a temperature associated with the cavity 12, which may be detected by a temperature sensor, output by or determined based on the dielectric sensors 20, etc.

In some examples, the pressure sensors 18 may be flush mounted in the cavity 12, and configured to sense in-mold pressure. The dielectric sensors 20 may be configured to sense in-mold resin degree of cure (e.g., based on ionic viscosity measurements). The resistance circuit sensor 16 may be configured to measure in-mold flow front position.

For example, the resistance circuit sensor 16 may include carbon fiber tow, metallic wire, etc., which is disposed across a majority of the longitudinal direction of the cavity 12 (e.g., at least 50% of the length, at least 80% of the length, at least 90% of the length, etc.), in order to measure a location of the front of the injected molding material within the cavity 12 based on the measure resistance of the resistance circuit sensor 16 (which may change as molding material moves across the area of the resistance circuit sensor 16). As shown in FIG. 1, the resistance circuit sensor 16 may be a linear circuit with multiple loops, where the mold injection source 14 uses edge gate injection to inject molding material into the cavity 12 and across the multiple loops of the resistance circuit sensor 16.

In some examples, the injection mold 10 may inject, e.g., epoxy or polyurethane with very low viscosity. The resin may be injected at a high pressure (e.g., 3000 PSI, or higher or lower), and may be injected for a specified period of time such as about thirty seconds (or more or less time). In-mold sensors may be used to measure molding process values during the thirty seconds (or more or less), to predict whether the molding process is operating normally or abnormally during the time period. The output of a machine learning model may be used to provide an alert and change process parameters, such as by reducing the injection flow rate, if an anomaly is predicted by an output of the machine learning model based on the sensor values during the injection process (e.g., in-line flow rate modification to enable real-time process optimization during the molding process). This may reduce a scrap ratio of the manufacturing process, by reducing the number of molded components having defects.

Figure 2:
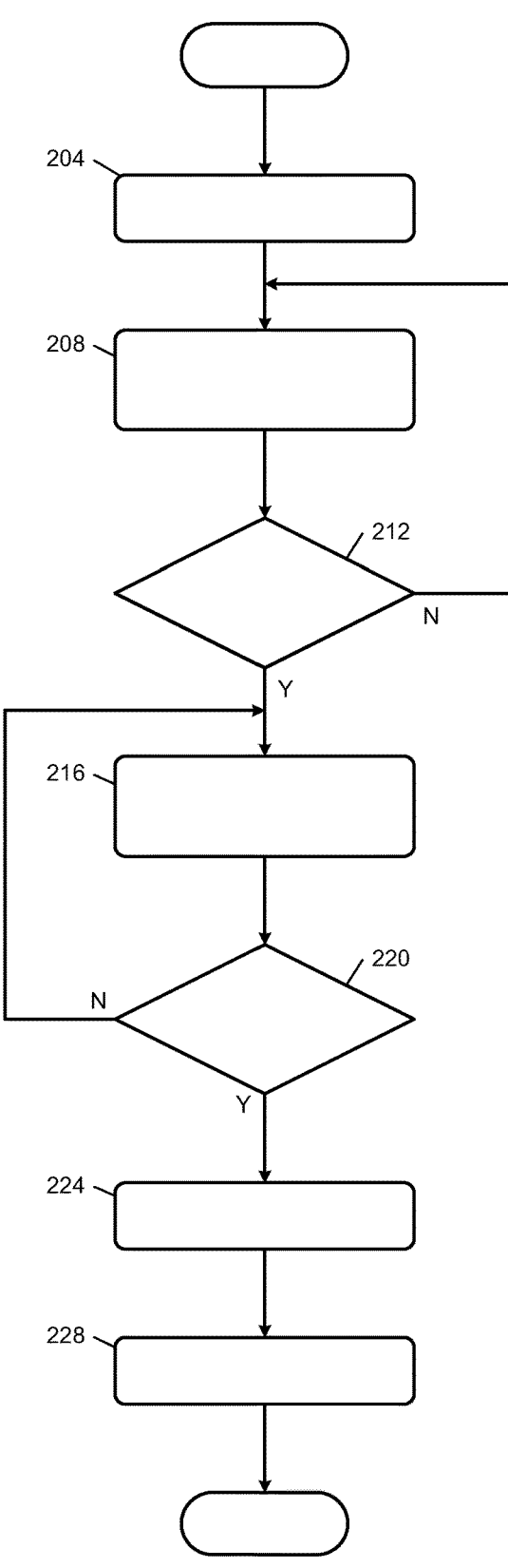
FIG. 2 is a flowchart depicting an example process for executing a molding cycle using a press.

FIG. 2 is a flowchart depicting an example process for executing a molding cycle using a press. The process may be performed by, for example, mold process control module 22 of FIG. 1. At 204, the method begins by initiating a molding cycle (e.g., of the injection mold 10 of FIG. 1).

At 208, the mold process control module 22 is configured to close a press to a specified distance from a final position (e.g., within 0.1 inches of the final position, etc.). Control then determines whether a vacuum port is closed at 212. If not, control returns to 208 while waiting for the vacuum port to close.

If the vacuum port is closed at 212, control proceeds to 216 to close the press to the final position (e.g., a position where the press is maintained during the injection of the molding material), and applies tonnage to the press. Control then determines at 220 whether the system is ready to inject resin (e.g., via the mold injection source 14).

If the system is not ready to inject resin (or other suitable molding material) at 220, the process returns to 216 and waits until the molding material injection is ready. Once the system is ready to inject resin at 220, the process proceeds to 224 to inject molding material into the mold (e.g., into the cavity 12). The mold process control module 22 then cures the resin at 228.

Figure 3:
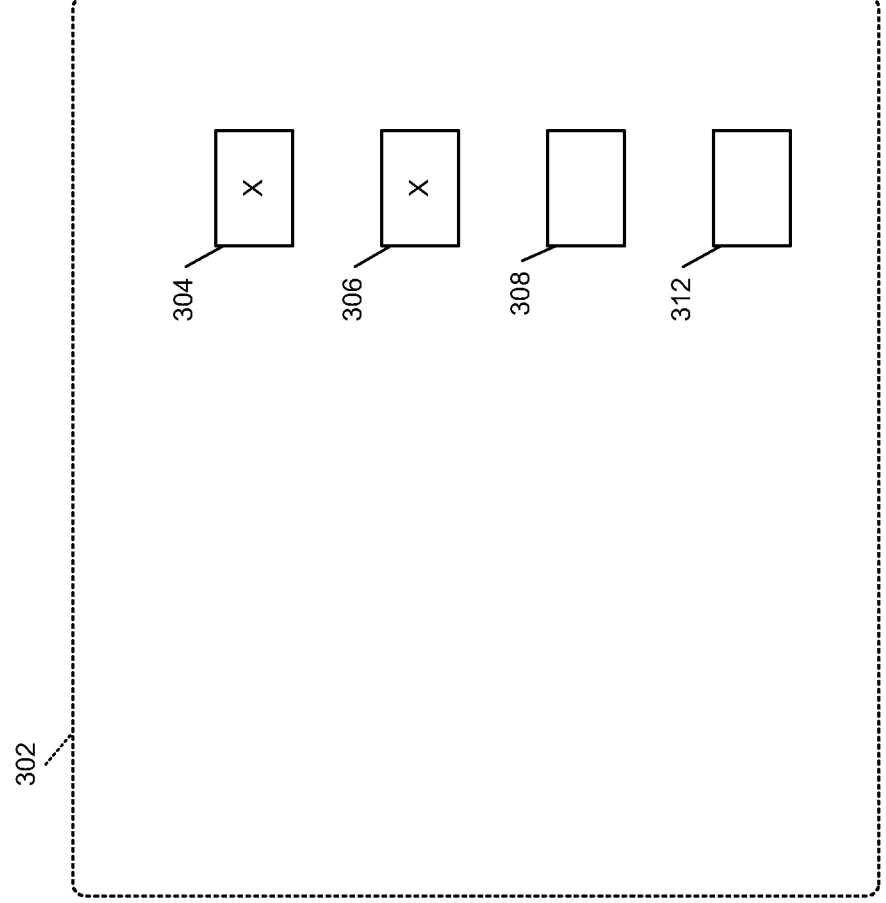
FIG. 3 is a diagram illustrating an example human-machine interface displaying control options for a molding process using a trained model.

FIG. 3 is a diagram illustrating an example human-machine interface (HMI) displaying control options for a molding process using a trained model. As shown in FIG. 3, the human-machine interface 302 includes various buttons, toggles, options, etc., for selection via user input.

The human-machine interface 302 may include any suitable display, touchscreen, user interface, etc., configured to display text and receive input from a user, such as an operator of the injection mold 10. The human-machine interface 302 may provide various options and modes for the operator to control the injection mold 10.

For example, a training input 304 may allow an operator to train a predictive model, such as by training a machine learning model to control a flow rate of material from the mold injection source 14 based on a predicted likelihood of a mold quality index indicating presence or absence of a defect in the molded component. The trained model may receive input from various sensors, such as the pressure sensors 18, the dielectric sensors 20, and the resistance circuit sensor 16.

The human-machine interface 302 may provide an operation mode option for a user to control operation of the injection mold 10 using a trained model. For example, a model selection input 306 may allow a user to whether a trained model will be used as part of a control for the mold process. Optionally, the user may be able to select one of multiple types of trained models to use as part of the mold process control, such as a trained artificial intelligence model, a trained machine learning model, etc.

In the training mode, the model may be supplied with training data that includes input sequences of data from simulations, and associated molding data. The molding data may be collected from simulation, from lab experiments, etc. The user may be able to specify input sensor sources for training the model, via the human-machine interface 302.

As another example input, a sensor type input 308 may allow a user to select which types of sensors will be used for control of the molding process, such as the pressure sensors 18, the dielectric sensors 20, and the resistance circuit sensor 16. The user may be able to specify a threshold value to trigger a modified flow rate (e.g., a mold quality index indicative of a likely defect in the molded component). The example flow rate input 312 may allow a user to select a flow rate for the molding material from the mold injection source 14, a rate at which the flow rate is reduced if the model predicts a defect likelihood above a specified threshold, etc.

In some examples, the human-machine interface 302 includes an input for configuring the deviation percentage from sensor and circuitry readings to trigger process control. In the training mode, the system may gather pressure and resistance data (and/or dielectric or temperature sensor data) from the array of sensors and circuitry embedded in the composite.

The system may append user input regarding the quality of each molded panel. For example, an inspection device at the end of the molded component manufacturing line, such as an X-ray imager or a thermography imager, may append mold quality index data to a set of training data automatically.

After data collection, machine learning software may be configured to calibrate an algorithm (e.g., train a model) to evaluate, for example, a conditional density function for occurrence of quality defects based on deviations in pressure and circuitry readings.

In a production mode, the system may be configured to observe the pressure and resistance readings (and optionally dielectric or temperature sensor readings), and provide those readings as input to the pre-calibrated conditional estimation algorithm (e.g., the trained machine learning model).

The system may be configured to infer a probability of defects in the molded component based on an output of the trained model (e.g., a predicted mold quality index for the molded component). If this inferred probability of defects exceeds a specified threshold value, a predicted anomaly in the molding process is triggered, and a modified control process is initiated.

For example, the modified control process may include reducing the flow rate of injection molding material by a factor alpha ($\alpha$). The system may be configured to measure the pressure and resistance after changing the flow rate, and recalculate the probability of defects for the new flow rate. If the probability of defects is less than the specified threshold value (e.g., indicating that the resulting molded component will likely be free from defects), the system may increase the flow rate by a factor beta ($\beta$).

The system may be configured to repeat the process at each measurement step until the probability of defects is lower than a specified tolerance value. If the probability of defects continues to increase with time, or does not reduce back below the specified threshold, the system may generate a notification that the molded component should be scrapped. In some examples, the system may be configured to implement other control measurements based on pressure data, dielectric sensor data, circuit resistance data, temperature data, etc.

Figure 4:
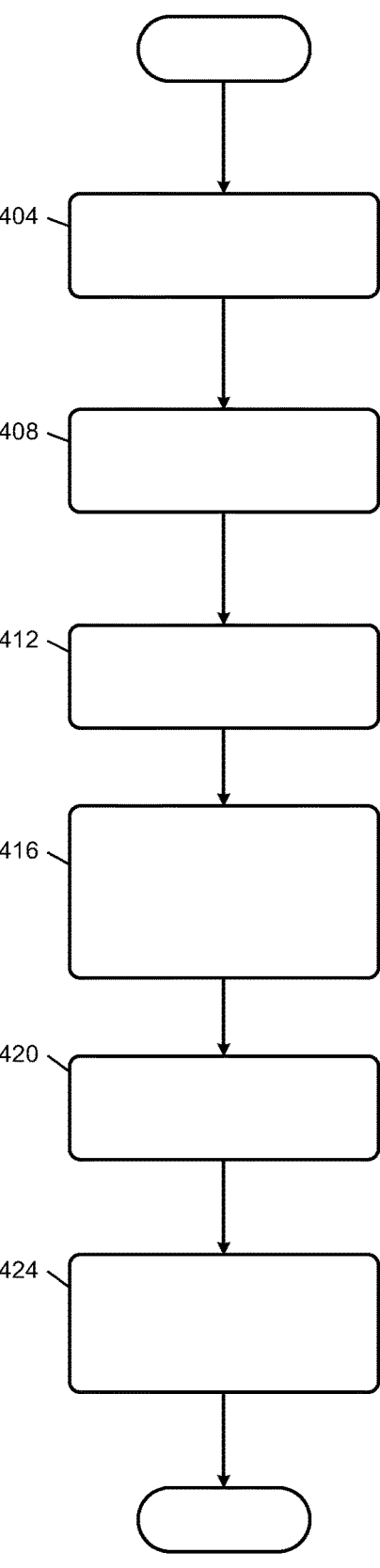
FIG. 4 is a flowchart depicting an example process for adjusting a molding process using a trained model.

FIG. 4 is a flowchart depicting an example process for adjusting a molding process using a trained model. The process may be performed by, for example, mold process control module 22 of FIG. 1. At 204, the method begins by measuring pressure over time (e.g., P (t)). The pressure sensor data may be obtained by, for example, the pressure sensors 18 of FIG. 1.

At 408, the mold process control module 22 is configured to measure resistance circuitry data over time (e.g., R (t). The resistance circuitry data may be obtained by, for example, the resistance circuit sensor 16 of FIG. 1. Although FIG. 4, does not refer to the dielectric sensors 20, in other example embodiments the system may obtain dielectric data over time from the dielectric sensors 20.

At 412, the process obtains mold quality index values from molded components after the molding process is completed. For example, an X-ray image, thermography image, visual inspection, etc. may be used to determine whether the molded component includes any molding defects (such as voids or fiber problems), to set a mold quality index value for the molded component.

The process proceeds to 416 to calibrate a predictive model (e.g., a trained machine learning model) to evaluate a conditional probability of a quality index, based on the pressure and resistance values. For example, a predictive model may be trained using sensor data inputs and resulting mold quality index values as training data, to train the model to generate a prediction output indicative of a likelihood that a molded component will have a quality index above a specified threshold (e.g., a probability that the molded component will have a defect) based on the sensor data input received over time during execution of the molding process. Although FIG. 4 illustrates training the model using pressure and resistance circuitry data, other example embodiments may train the model using other suitable sensor input data, such as dielectric value data, temperature data, etc., alone or in various combinations.

In some examples, the trained model may use statistical learning algorithms that permit the estimation of joint density functions and conditional density functions from sparse data. The sparse data challenge may be addressed by using intrinsic localization techniques and sampling techniques adapted to these localizations.

Localization techniques such as diffusion kernels, k-clustering, and PCA, may be used to extract knowledge from sparse data. Data augmentation techniques may be used to sample on the localized structures. Example data augmentation techniques may include (but are not limited to) ridge regression, projected sampling, and projected MCMC.

At 420, the mold process control module 22 is configured to implement the trained model to predict quality index values for future mold cycles. For example, mold cycles may be executed repeatedly, with the trained model providing real-time predictions of a resulting mold quality index throughout the molding process, based on sensor input measured periodically or continuously during the molding process.

At 424, the process modifies the mold process parameters during the mold process, based on the quality index prediction from the output of the trained machine learning model. For example, if the trained model provides a prediction of a high quality index value, the molding process may continue without change (e.g., by maintaining a current flow rate, etc.).

If the trained machine learning model predicts a quality index value below a specified threshold, the mold process control module 22 may reduce a flow rate of the molding material injected from the mold injection source 14, to allow the quality of the molded component to improve. The amount of reduction in flow rate may be set within the system, set by a user, etc.

If the predicted mold quality index output by the trained model remains below the specified threshold for a set period of time after reducing the molding material flow rate, the system may generate a notification of a predicted defective molded component, to alert a user to consider scrapping the resulting defective molded component. If the predicted mold quality index output by the trained model increases above the specified threshold after reducing the mold flow rate, the system may increase the mold flow rate back to the original value.

Figure 5:
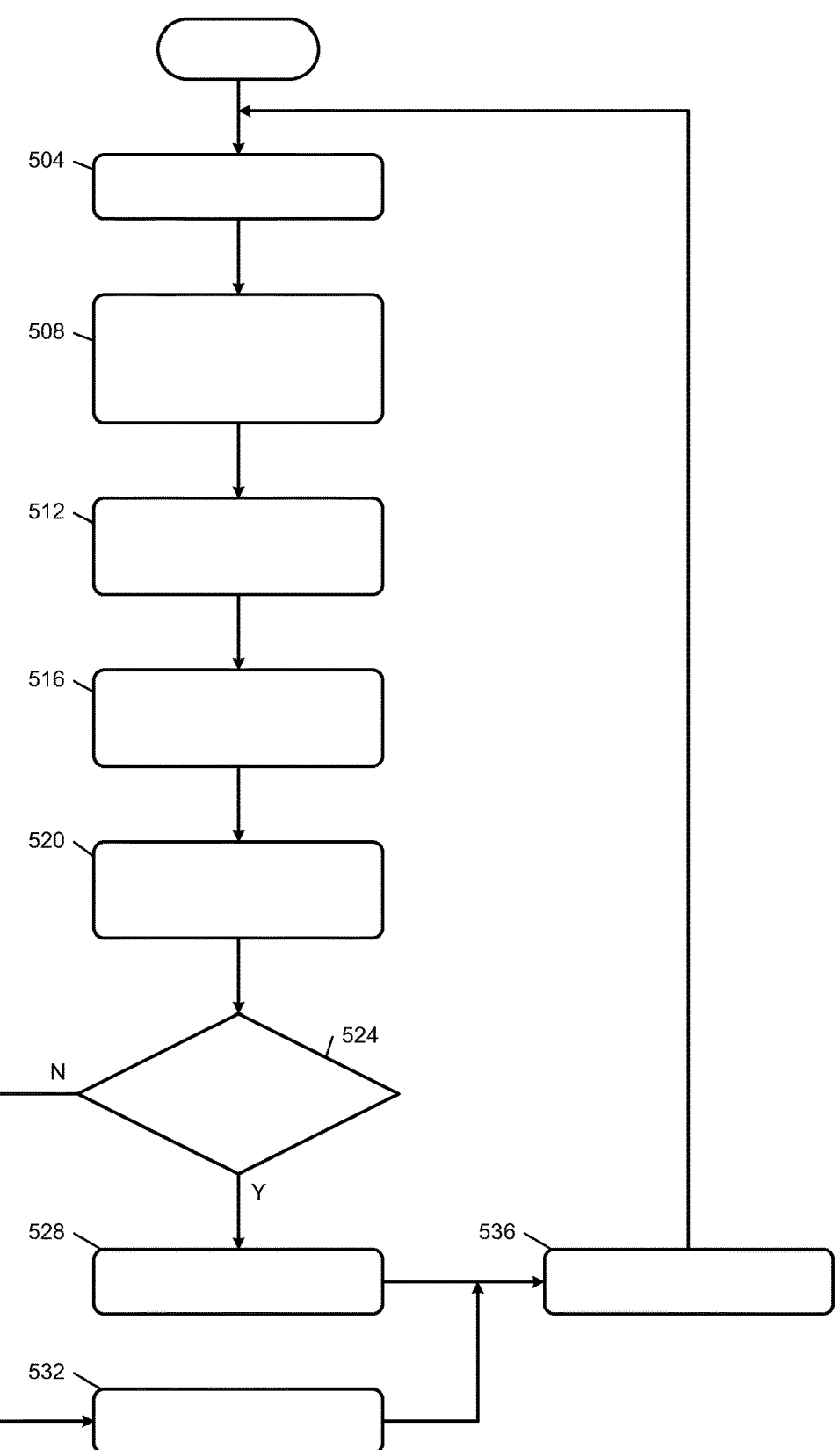
FIG. 5 is flowchart depicting an example process for modifying a molding process based on mold pressure sensor data.

FIG. 5 is flowchart depicting an example process for modifying a molding process based on mold pressure sensor data. The process may be performed by, for example, mold process control module 22 of FIG. 1. At 504, the method begins by measuring pressure sensor data at a time value t.

The measured pressure value is added to accumulated pressure sensor data over a time period, at 508. For example, the measured pressure sensor data may be added to accumulated pressure sensor data since the start of the mold process, etc.

At 512, the mold process control module 22 is configured to supply the accumulated pressure sensor data to the trained predictive model. The process then generates a defect probability based on the model output at 516. For example, the trained model may receive the pressure data as a model input, and then generate a predicted mold quality index for the molded component at the end of the molding process.

At 520, the mold process control module 22 is configured to compare the defect probability prediction (e.g., output of the machine learning model) to a specified threshold value. The specified threshold value may be set by an administrator, a user, historical mold quality index values associated with passing and defective mold components, etc.

At 524, the process determines whether the defect probability is greater than a specified threshold (e.g., a predicted mold quality index is indicative of a likely defective molded component). If the defect probability is greater than the specified threshold at 524, control proceeds to 528 to modify the flow rate, such as by reducing the flow rate of resin from the mold injection source 14.

For example, the process may use a linear closed-loop control of the flow rate, based on the following equations:

$$\beta_1 = f$$

$$\beta_{i+1} = b_{i-1} * (P(\text{defect}) - \text{threshold})_i / (P(\text{defect}) - \text{threshold})_{i-1}$$

$$Q_i = Q_{i-1} * (1 + \beta_i)$$

If the defect probability is less than a specified threshold (e.g., the predicted mold quality index is indicative of a likely passing or high quality molded component), control maintains the current flow rate at 532. After modifying the flow rate at 528, or maintaining the current flow rate at 532, control proceeds to 536 to increment a time count value (e.g., where the pressure data is measured periodically) and returns to 504 to measure pressure sensor data again.

Figure 6:
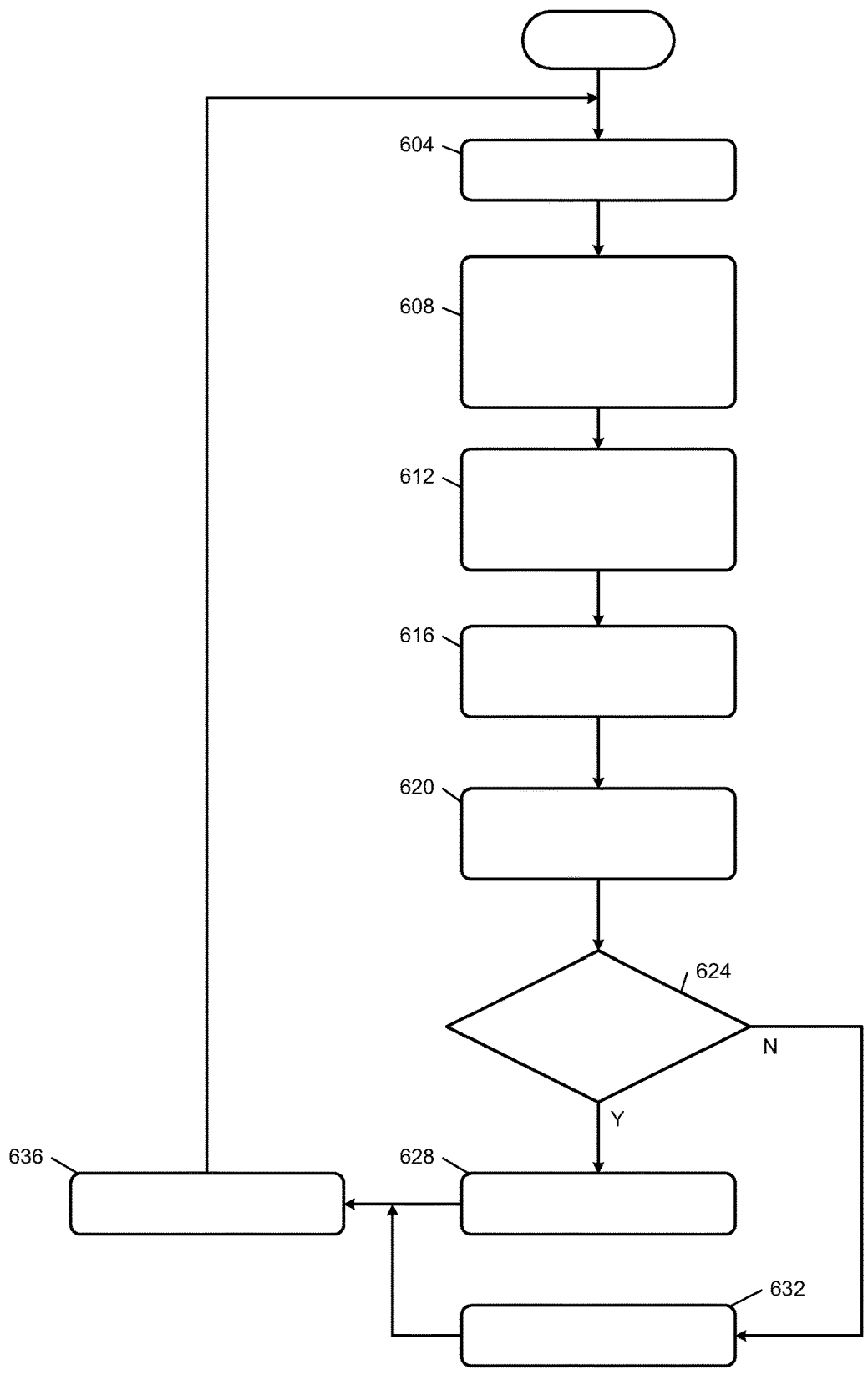
FIG. 6 is flowchart depicting an example process for modifying a molding process based on mold resistance circuitry data.

FIG. 6 is flowchart depicting an example process for modifying a molding process based on mold resistance circuitry data. The process may be performed by, for example, mold process control module 22 of FIG. 1. At 604, the method begins by measuring resistance circuitry data at a time value t.

The measured resistance circuitry value is added to accumulated resistance circuitry data over a time period, at 608. For example, the measured resistance circuitry data may be added to accumulated resistance circuitry data since the start of the mold process, etc.

At 612, the mold process control module 22 is configured to supply the accumulated resistance circuitry data to the trained predictive model. The process then generates a defect probability based on the model output at 616. For example, the trained model may receive the resistance circuitry data as a model input, and then generate a predicted mold quality index for the molded component at the end of the molding process.

At 620, the mold process control module 22 is configured to compare the defect probability prediction (e.g., output of the machine learning model) to a specified threshold value. At 624, the process determines whether the defect probability is greater than a specified threshold. If the defect probability is greater than the specified threshold at 624, control proceeds to 628 to modify the flow rate, such as by reducing the flow rate of resin from the mold injection source 14.

For example, the process may use a linear closed-loop control of the flow rate, based on the following equations:

$$\beta 1 = f$$

$$\beta i + 1 = bi - 1 * (P(\text{defect}) - \text{threshold})i / (P(\text{defect}) - \text{threshold})i - 1$$

$$Qi = Qi - 1 * (1 + \beta i)$$

If the defect probability is less than a specified threshold, control maintains the current flow rate at 632. After modifying the flow rate at 628, or maintaining the current flow rate at 632, control proceeds to 636 to increment a time count value (e.g., where the resistance circuitry data is measured periodically) and returns to 604 to measure resistance circuitry sensor data again.

Figure 7:
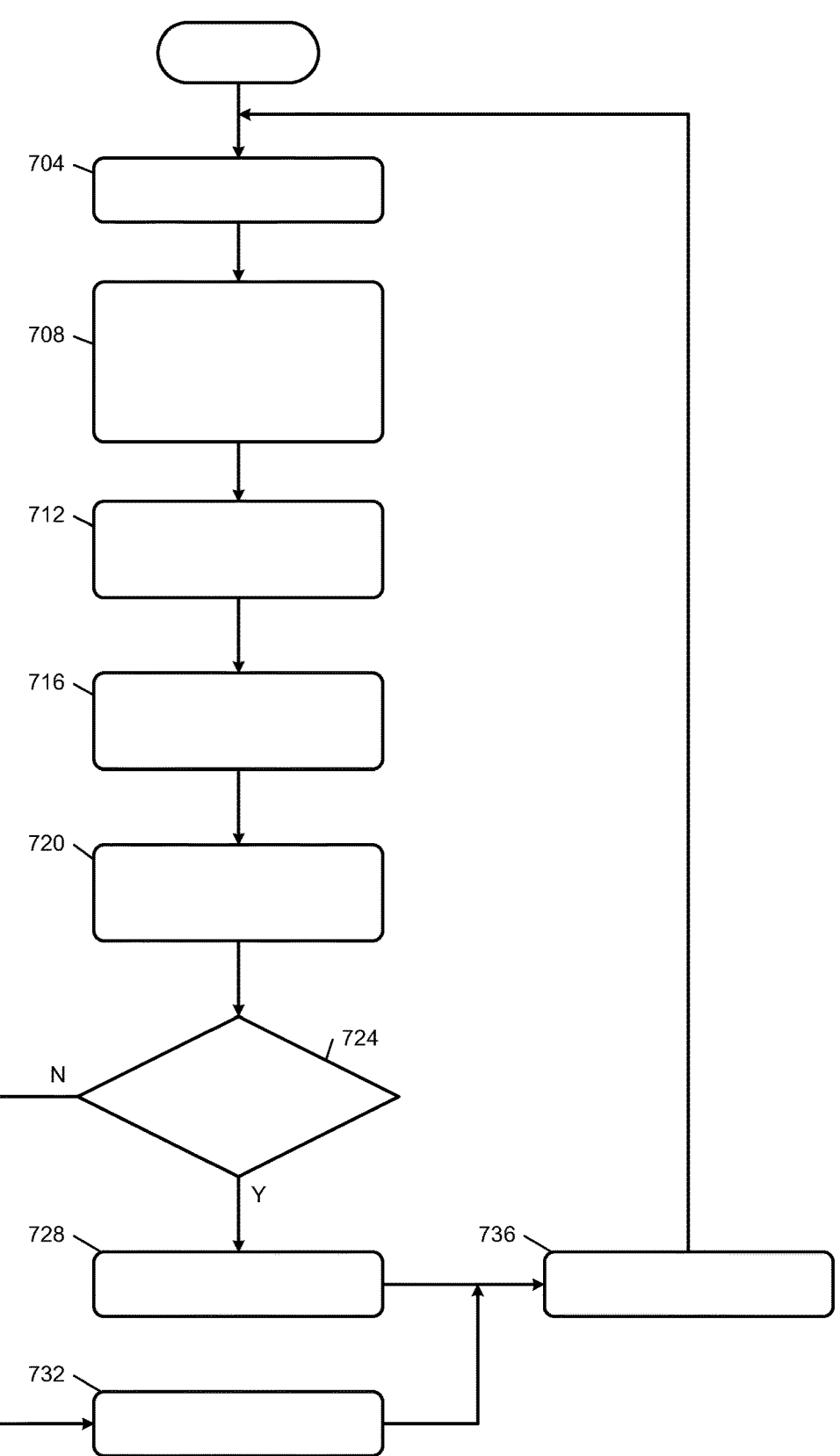
FIG. 7 is a flowchart depicting an example process for modifying a molding process based on mold dielectric sensor data.

FIG. 7 is a flowchart depicting an example process for modifying a molding process based on mold dielectric sensor data. The process may be performed by, for example, mold process control module 22 of FIG. 1. At 704, the method begins by measuring dielectric sensor data at a time value t.

The measured dielectric sensor value is added to accumulated dielectric sensor data over a time period, at 708. For example, the measured dielectric sensor data may be added to accumulated dielectric sensor data since the start of the mold process, etc.

At 712, the mold process control module 22 is configured to supply the accumulated dielectric sensor data to the trained predictive model. The process then generates a defect probability based on the model output at 716. For example, the trained model may receive the dielectric sensor data as a model input, and then generate a predicted mold quality index for the molded component at the end of the molding process.

At 720, the mold process control module 22 is configured to compare the defect probability prediction to a specified threshold value. At 724, the process determines whether the defect probability is greater than a specified threshold. If the defect probability is greater than the specified threshold at 724, control proceeds to 6728 to modify the flow rate.

For example, the process may use a linear closed-loop control of the flow rate, based on the following equations:

$$\beta_1 = f$$

$$\beta_{i+1} = b_{i-1} * (P(\text{defect}) - \text{threshold})_i / (P(\text{defect}) - \text{threshold})_{i-1}$$

$$Q_i = Q_{i-1} * (1 + \beta_i)$$

If the defect probability is less than a specified threshold, control maintains the current flow rate at 732. After modifying the flow rate at 728, or maintaining the current flow rate at 732, control proceeds to 736 to increment a time count value (e.g., where the dielectric sensor data is measured periodically) and returns to 604 to measure dielectric sensor data again.

Although FIGS. 5-7 illustrate models which control flow rate based on pressure sensor data, dielectric sensor data and resistance circuitry data individually, other example embodiments may use combinations of two of these sensor data types, all three of these sensor data types, other sensor data types, etc.

Figures 8A, 8B:
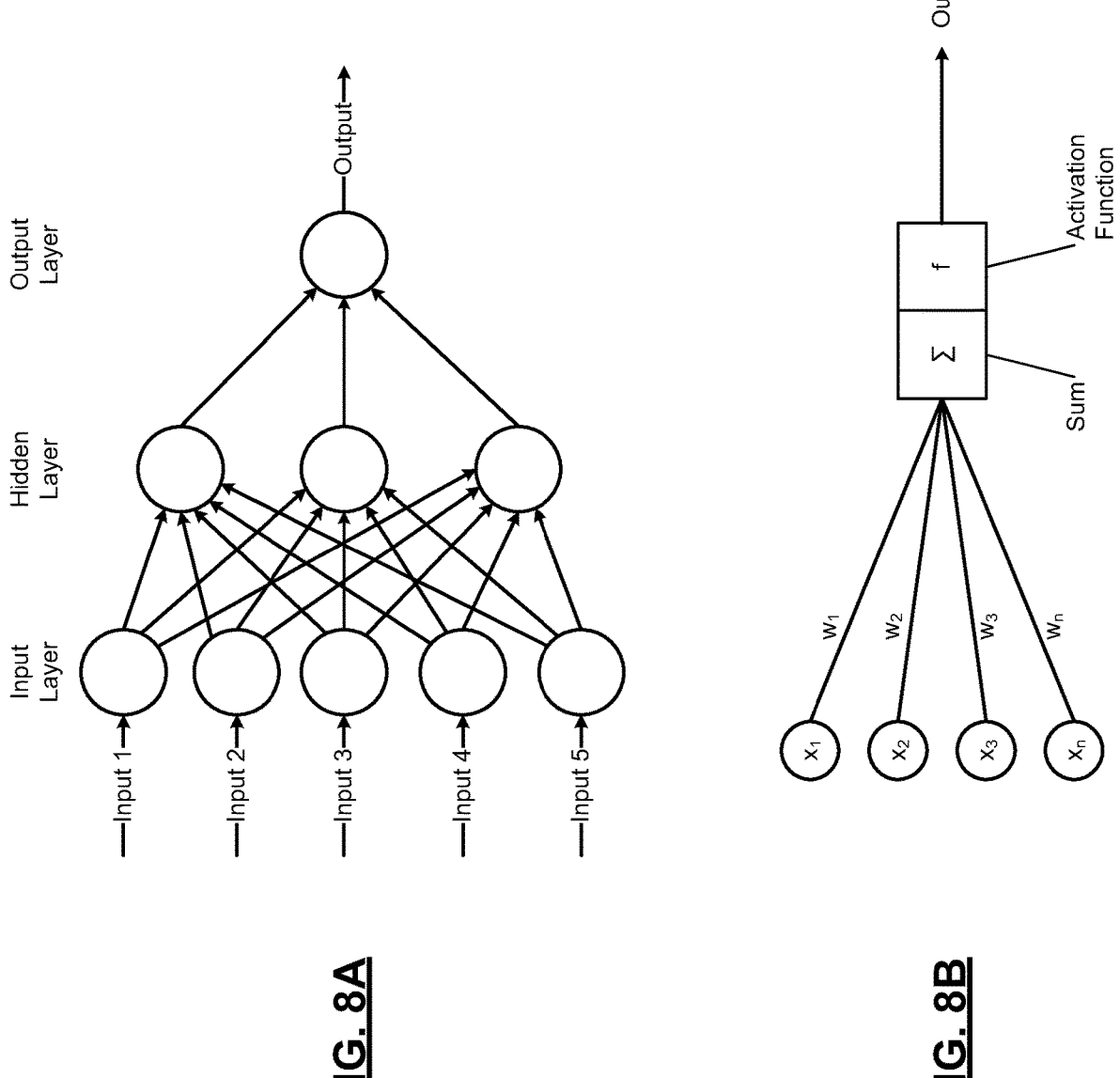
FIGS. 8A and 8B are graphical representations of example recurrent neural networks for predicting a mold quality index based on mold sensor data.

FIGS. 8A and 8B show an example of a recurrent neural network used to generate models such as those described above, using machine learning techniques. Machine learning is a method used to devise complex models and algorithms that lend themselves to prediction (for example, patient and provider matching predictions). The models generated using machine learning, such as those described above, can produce reliable, repeatable decisions and results, and uncover hidden insights through learning from historical relationships and trends in the data.

The purpose of using the recurrent neural-network-based model, and training the model using machine learning as described above, may be to directly predict dependent variables without casting relationships between the variables into mathematical form. The neural network model includes a large number of virtual neurons operating in parallel and arranged in layers. The first layer is the input layer and receives raw input data. Each successive layer modifies outputs from a preceding layer and sends them to a next layer. The last layer is the output layer and produces output of the system.

FIG. 8A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 8B). In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination (R2) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit). The neural network can receive inputs, e.g., vectors, which can be used to generate models that can be used with mold process control, such as adjusting molding material flow rate based on a mold quality index prediction according to received pressure, dielectric and resistance circuitry data inputs.

Figure 9:
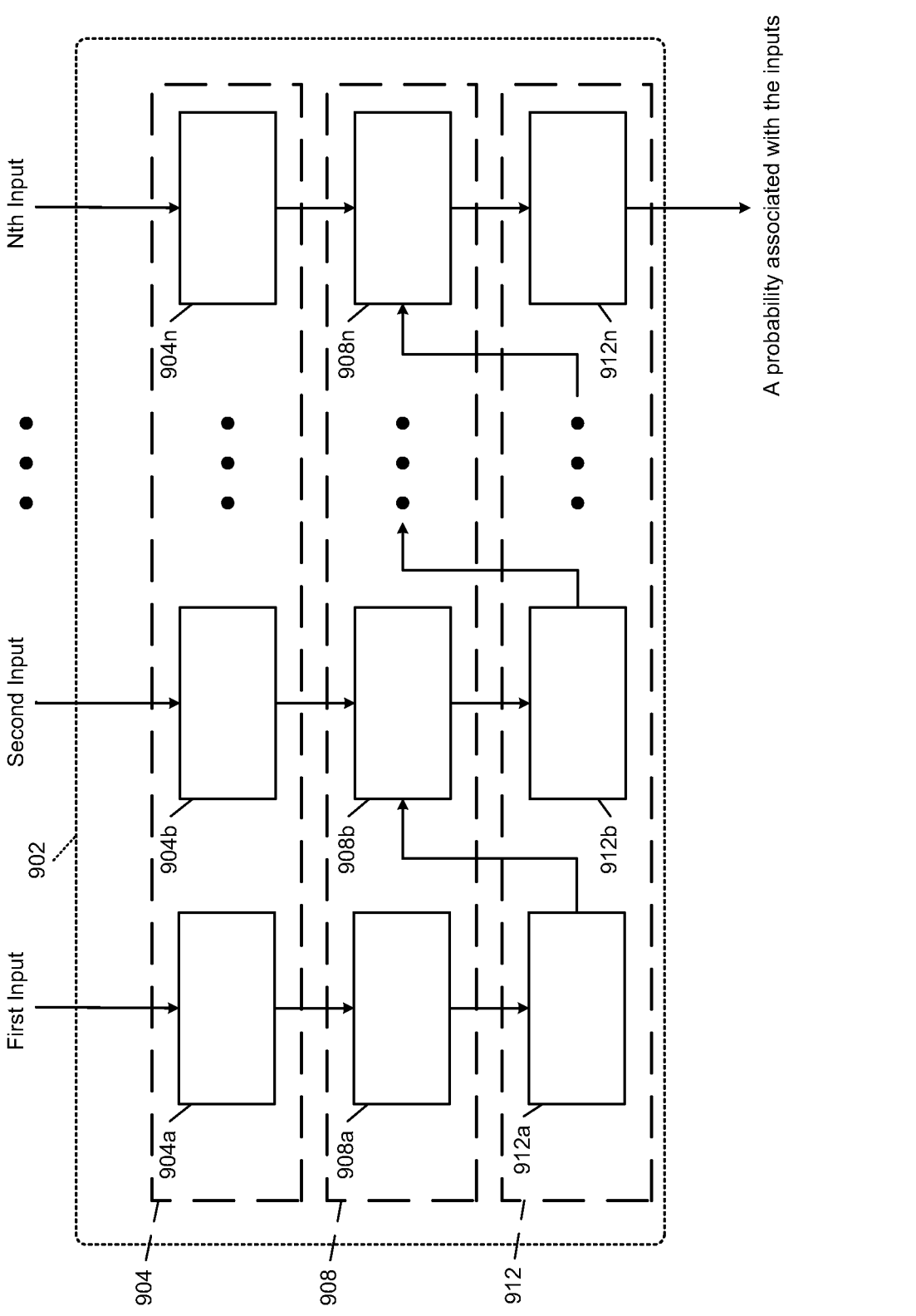
FIG. 9 is a graphical representation of layers of an example long short-term memory (LSTM) machine learning model.

FIG. 9 illustrates an example of a long short-term memory (LSTM) neural network 902 used to generate models such as those described above, using machine learning techniques, although other example embodiments may include other types of machine learning models including transformer layers, other model topologies, etc. The generic example LSTM neural network 902 may be used to implement a machine learning model, and various implementations may use other types of machine learning networks (such as transformer layers, other model topologies or architectures, etc.). The LSTM neural network 902 includes an input layer 904, a hidden layer 908, and an output layer 912. The input layer 904 includes inputs 904a, 904b . . . 904n. The hidden layer 908 includes neurons 908a, 908b . . . 908n. The output layer 912 includes outputs 912a, 912b . . . 912n.

Each neuron of the hidden layer 908 receives an input from the input layer 904 and outputs a value to the corresponding output in the output layer 912. For example, the neuron 908a receives an input from the input 904a and outputs a value to the output 912a. Each neuron, other than the neuron 908a, also receives an output of a previous neuron as an input. For example, the neuron 908b receives inputs from the input 904b and the output 912a. In this way the output of each neuron is fed forward to the next neuron in the hidden layer 908. The last output 912n in the output layer 912 outputs a probability associated with the inputs 904a-904n. Although the input layer 904, the hidden layer 908, and the output layer 912 are depicted as each including three elements, each layer may contain any number of elements.

In various implementations, each layer of the LSTM neural network 902 must include the same number of elements as each of the other layers of the LSTM neural network 902. In some example embodiments, a convolutional neural network may be implemented. Similar to LSTM neural networks, convolutional neural networks include an input layer, a hidden layer, and an output layer. However, in a convolutional neural network, the output layer includes one less output than the number of neurons in the hidden layer and each neuron is connected to each output. Additionally, each input in the input layer is connected to each neuron in the hidden layer. In other words, input 904a is connected to each of neurons 908a, 908b . . . 908n.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy. The neural network of FIG. 9 can receive inputs, e.g., vectors, which can be used to generate models that can be used, for example, for adjusting molding material flow rate based on a mold quality index prediction according to received pressure, dielectric and resistance circuitry data inputs.

Figure 10:
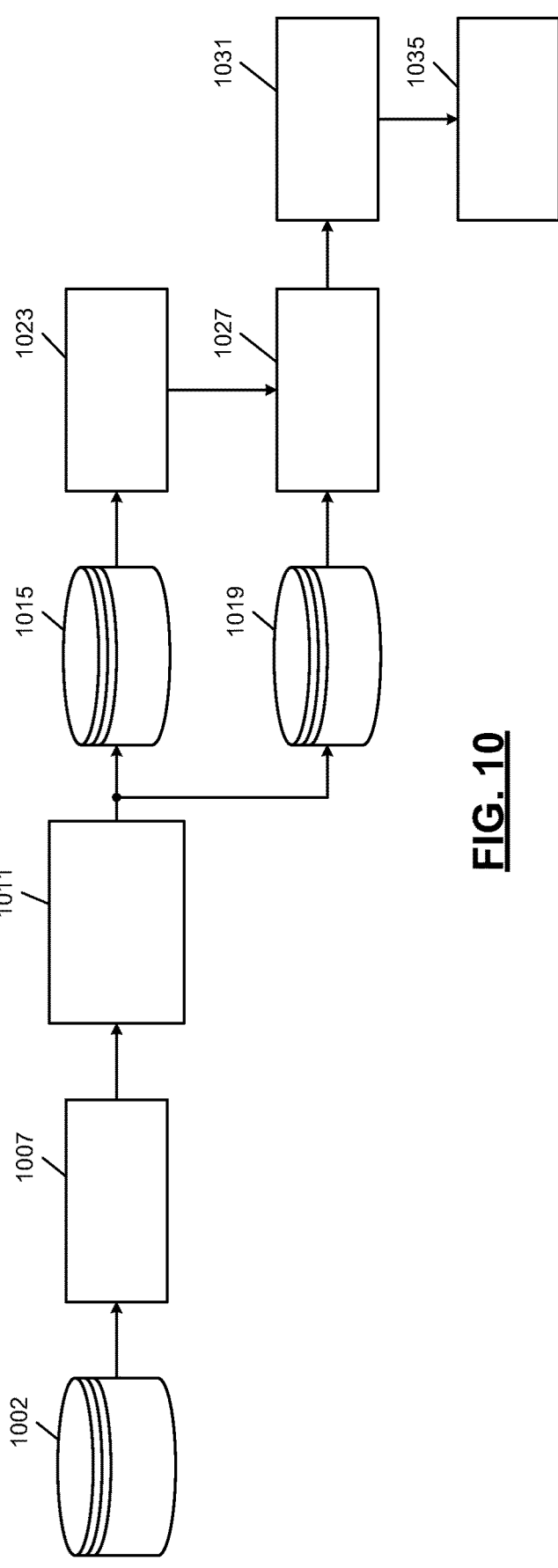
FIG. 10 is a flowchart illustrating an example process for training a machine learning model.

FIG. 10 illustrates an example process for generating a machine learning model. At 1007, control obtains data from a database 1002 (e.g., a data warehouse). The data may include any suitable data for developing machine learning models.

At 1011, control separates the data obtained from the database 1002 into training data 1015 and test data 1019. The training data 1015 is used to train the model at 1023, and the test data 1019 is used to test the model at 1027. Typically, the set of training data 1015 is selected to be larger than the set of test data 1019, depending on the desired model development parameters. For example, the training data 1015 may include about seventy percent of the data acquired from the database 1002, about eighty percent of the data, about ninety percent, etc. The remaining thirty percent, twenty percent, or ten percent, is then used as the test data 1019.

Separating a portion of the acquired data as test data 1019 allows for testing of the trained model against actual output data, to facilitate more accurate training and development of the model at 1023 and 1027. The model may be trained at 1023 using any suitable machine learning model techniques, including those described herein, such as random forest, generalized linear models, decision tree, and neural networks.

At 1031, control evaluates the model test results. For example, the trained model may be tested at 1027 using the test data 1019, and the results of the output data from the tested model may be compared to actual outputs of the test data 1019, to determine a level of accuracy. The model results may be evaluated using any suitable machine learning model analysis, such as the example techniques described further below.

After evaluating the model test results at 1031, the model may be deployed at 1035 if the model test results are satisfactory. Deploying the model may include using the model to make predictions for a large-scale input dataset with unknown outputs. If the evaluation of the model test results at 1031 is unsatisfactory, the model may be developed further using different parameters, using different modeling techniques, using other model types, etc. The machine learning model method of FIG. 10 can receive inputs, e.g., vectors, which can be used to generate models that can be used, for example, for adjusting molding material flow rate based on a mold quality index prediction according to received pressure, dielectric and resistance circuitry data inputs.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A resin transfer molding system comprising:
a resin transfer mold configured to mold a composite material via resin injection and curing;
at least one pressure sensor configured to measure an in-mold pressure of the resin transfer mold;
at least one dielectric sensor configured to measure an in-mold degree of cure value of the injected resin;
at least one resistance circuit configured to measure an in-mold flow front position of the injected resin; and
a molding process control module configured to:
determine a molding process anomaly status by comparing a specified anomaly threshold to at least one of pressure data obtained from the at least one pressure sensor, degree of cure data obtained from the at least one dielectric sensor, or flow front position data obtained from the at least one resistance circuit, wherein determining the molding process anomaly status includes supplying the pressure data, the degree of cure data, and the flow front position data to a trained machine learning model, and wherein the determination of the molding process anomaly status is based on an output of the trained machine learning model;
reduce an injection flow rate of the resin in response to a determination of a molding process anomaly; and
maintain the injection flow rate in response to a determination of normal molding process operation without the molding process anomaly.

2. The resin transfer molding system of claim 1, wherein the molding process control module is configured to, subsequent to reducing the injection flow rate:
determine the molding process anomaly status by comparing the specified anomaly threshold to at least one of the pressure data, degree of cure data, or flow front position data; and
increase the injection flow rate in response to a determination of normal molding process operation without the molding process anomaly.

3. The resin transfer molding system of claim 1, wherein determining the molding process anomaly status includes comparing the specified anomaly threshold to at least two of the pressure data, degree of cure data, or flow front position data.

4. The resin transfer molding system of claim 1, wherein determining the molding process anomaly status includes comparing the specified anomaly threshold to all three of the pressure data, degree of cure data, and flow front position data.

5. The resin transfer molding system of claim 1, wherein the molding process control module is configured to:
obtain a training data set including multiple mold quality index values each corresponding to at least one of pressure data obtained from the at least one pressure sensor, degree of cure data obtained from the at least one dielectric sensor, or flow front position data obtained from the at least one resistance circuit; and
train a machine learning model, using the training data set, to generate the trained machine learning model.

6. The resin transfer molding system of claim 5, wherein each of the multiple mold quality index values is obtained via at least one of an X-ray image or a thermography image of a composite material subsequent to curing.

7. The resin transfer molding system of claim 1, wherein:

the at least one pressure sensor includes a pressure sensor flush mounted in a cavity of the resin transfer mold;

the at least one dielectric sensor is configured to measure an ionic viscosity of the resin in the cavity; and the at least one resistance circuit includes resistance circuitry extending across at least eighty percent of a longitudinal direction of the cavity.

8. The resin transfer molding system of claim 7, wherein the molding process control module is configured to:

close a press of the resin transfer mold to a mold position, and apply tonnage to the press;

inject an epoxy or a polyurethane as the resin into the cavity of the resin transfer mold; and execute a curing cycle subsequent to injecting the epoxy or polyurethane into the cavity of the resin transfer mold.

9. The resin transfer molding system of claim 1, further comprising a human-machine interface configured to display a training mode option and an operation mode option for selection by a user, wherein:

the human-machine interface is configured to receive an input to set the specified anomaly threshold in response to selection of the operation mode option; and the human-machine interface is configured to receive an input to specify one or more sensor sources to train the trained machine learning model in response to selection of the training mode option.

10. A method for controlling a resin transfer molding process, the method comprising:

executing a resin transfer molding process to mold a composite material via resin injection and curing in a resin transfer mold;

measuring, by at least one pressure sensor, an in-mold pressure of the resin transfer mold;

measuring, by at least one dielectric sensor, an in-mold degree of cure value of the injected resin;

measuring, by at least one resistance circuit, an in-mold flow front position of the injected resin;

determining a molding process anomaly status by comparing a specified anomaly threshold to at least one of pressure data obtained from the at least one pressure sensor, degree of cure data obtained from the at least one dielectric sensor, or flow front position data obtained from the at least one resistance circuit, wherein determining the molding process anomaly status includes supplying the pressure data, the degree of cure data, and the flow front position data to a trained machine learning model, and wherein the determination of the molding process anomaly status is based on an output of the trained machine learning model;

reducing an injection flow rate in response to a determination of a molding process anomaly; and maintaining the injection flow rate in response to a determination of normal molding process operation without the molding process anomaly.

11. The method of claim 10, further comprising, subsequent to reducing the injection flow rate:

determining the molding process anomaly status by comparing the specified anomaly threshold to at least one of the pressure data, degree of cure data, or flow front position data; and increasing the injection flow rate in response to a determination of normal molding process operation without the molding process anomaly.

12. The method of claim 10, wherein determining the molding process anomaly status includes comparing the specified anomaly threshold to at least two of the pressure data, degree of cure data, or flow front position data.

13. The method of claim 10, wherein determining the molding process anomaly status includes comparing the specified anomaly threshold to all three of the pressure data, degree of cure data, and flow front position data.

14. The method of claim 10, further comprising:

obtaining a training data set including multiple mold quality index values each corresponding to at least one of pressure data obtained from the at least one pressure sensor, degree of cure data obtained from the at least one dielectric sensor, or flow front position data obtained from the at least one resistance circuit; and training a machine learning model, using the training data set, to generate the trained machine learning model.

15. The method of claim 14, wherein each of the multiple mold quality index values is obtained via at least one of an X-ray image or a thermography image of a composite material subsequent to curing.

16. The method of claim 10, wherein:

the at least one pressure sensor includes a pressure sensor flush mounted in a cavity of the resin transfer mold;

the at least one dielectric sensor is configured to measure an ionic viscosity of the resin in the cavity; and the at least one resistance circuit includes resistance circuitry extending across at least eighty percent of a longitudinal direction of the cavity.

17. The method of claim 16, further comprising:

closing a press of the resin transfer mold to a mold position, and apply tonnage to the press;

injecting an epoxy or a polyurethane as the resin into the cavity of the resin transfer mold; and executing a curing cycle subsequent to injecting the epoxy or polyurethane into the cavity of the resin transfer mold.

18. The method of claim 10, further comprising:

displaying, on a human-machine interface, a training mode option and an operation mode option for selection by a user;

receiving an input to set the specified anomaly threshold in response to selection of the operation mode option; and receiving an input to specify one or more sensor sources to train the trained machine learning model in response to selection of the training mode option.

* * * * *